(12) United States Patent
Dogre Cuevas

(10) Patent No.: US 6,250,558 B1
(45) Date of Patent: Jun. 26, 2001

(54) SHOWER TEMPERATURE AND PRESSURE CONTROL SYSTEM

(76) Inventor: Miguel E. Dogre Cuevas, 7840 Harding Ave., Apt. 11, Miami Beach, FL (US) 33141

( * ) Notice: Subject to any disclaimer, the term of this patent is extended or adjusted under 35 U.S.C. 154(b) by 0 days.

(21) Appl. No.: 09/370,139

(22) Filed: Aug. 9, 1999

(51) Int. Cl.[7] ............................. G05D 23/12; E03C 1/04
(52) U.S. Cl. ............................. 236/12.12; 4/676; 236/94
(58) Field of Search ............................. 236/12.12, 12.23, 236/92 R, 93 B, 94; 4/676

(56) References Cited

U.S. PATENT DOCUMENTS

| | | | |
|---|---|---|---|
| 4,359,186 | * | 11/1982 | Kiendl ................................. 236/12 A |
| 4,421,269 | * | 12/1983 | Ts'ao .................................. 236/12.12 |
| 4,682,728 | * | 7/1987 | Oudenhoven et al. ........... 236/12.12 |
| 4,869,427 | * | 9/1989 | Kawamoto et al. ............... 236/12.12 |
| 4,931,938 | * | 6/1990 | Hass ..................................... 364/152 |
| 5,979,776 | * | 11/1999 | Williams ........................... 236/12.12 |
| 6,029,094 | * | 2/2000 | Diffut ..................................... 700/32 |

\* cited by examiner

*Primary Examiner*—William Wayner

(57) ABSTRACT

A shower temperature and pressure control system including a bathtub with an associated shower outlet. A mixing valve is coupled to a hot water source and a cold water source. The mixing valve is adapted to control the amount of hot water and cold water to flow so as to maintain a flow of water with a constant temperature corresponding to a predetermined temperature. A restrictive valve is adapted to control the water pressure so that a flow of water is maintained with a constant pressure corresponding to a predetermined pressure. Finally, a control unit has temperature selection buttons adapted to transmit to the temperature sensor a predetermined temperature and pressure selection buttons adapted to transmit to the pressure sensor a predetermined pressure thus affording a unique method of controlling both the temperature and pressure of a shower.

5 Claims, 3 Drawing Sheets

SHOWER TEMPERATURE AND PRESSURE CONTROL SYSTEM

BACKGROUND OF THE INVENTION

1. Field of the Invention

The present invention relates to a shower temperature and pressure control system and more particularly pertains to allowing convenient control of a system for automatically regulating both the temperature and pressure of water flow in a shower.

2. Description of the Prior Art

The use of shower control systems is known in the prior art. More specifically, shower systems heretofore devised and utilized for the purpose of controlling the operation of a shower are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,923,116 to Homan; U.S. Pat. No. 5,358,177 to Cashmore; U.S. Pat. Des. 295,614 to Touch; U.S. Pat. Des. 341,542 to Wild et al.; U.S. Pat. No. 4,854,498 to Stayton; and U.S. Pat. No. 4,420,811 to Tarnay et al. are provided as being of general interest.

In this respect, the shower temperature and pressure control system according to the present invention substantially departs from the conventional concepts and designs of the prior art, and in so doing provides an apparatus primarily developed for the purpose of allowing convenient control of a system for automatically regulating both the temperature and pressure of water flow in a shower.

Therefore, it can be appreciated that there exists a continuing need for a new and improved shower temperature and pressure control system which can be used for allowing convenient control of a system for automatically regulating both the temperature and pressure of water flow in a shower. In this regard, the present invention substantially fulfills this need.

SUMMARY OF THE INVENTION

In view of the foregoing disadvantages inherent in the known types of shower control systems now present in the prior art, the present invention provides an improved shower temperature and pressure control system. As such, the general purpose of the present invention, which will be described subsequently in greater detail, is to provide a new and improved shower temperature and pressure control system which has all the advantages of the prior art and none of the disadvantages.

To attain this, the present invention essentially comprises a bathtub with an associated shower outlet. The shower outlet is coupled to a wall above the bathtub for dispensing water therefrom. Also included is a mixing valve situated behind the wall and coupled to a hot water source and a cold water source. The mixing valve is adapted to control the amount of hot water and cold water to flow therefrom. Such flow is governed as a function of a temperature control signal. Working in conjunction with the mixing valve is a temperature sensor situated within the shower head. The temperature sensor is adapted to gauge the temperature of the water in the shower head and allow the comparison thereof with a predetermined temperature. The temperature sensor is adapted to subsequently transmit to the mixing valve a temperature control signal so as to maintain a flow of water with a constant temperature corresponding to the predetermined temperature. The temperature sensor also generates an alarm signal upon the detection of water of which the temperature exceeds a predetermined amount. Also included is an alarm connected to the temperature sensor for producing an audible alarm. The alarm also generates a deactivation signal upon the receipt of the alarm signal. For controlling the pressure of water flow, a restrictive valve is situated behind the wall and coupled to the alarm. The restrictive valve is adapted to control the water pressure in a first mode of operation as a function of a pressure control signal. The restrictive valve is further adapted to preclude water flow to the shower outlet in a second mode of operation upon the receipt of a deactivation signal. A pressure sensor is connected to the restrictive valve and showerhead. The pressure sensor is adapted to gauge the pressure of the water in the shower head and allow the comparison thereof with a predetermined pressure. Acting as a feedback mechanism, the pressure sensor subsequently transmits to the restrictive valve a pressure control signal so as to maintain a flow of water with a constant pressure corresponding to the predetermined pressure. Finally, a control unit is situated on the wall above the bathtub. The control unit has a plurality of temperature buttons each adapted to discretely define the predetermined temperature and allow the transmission thereof to the temperature sensor. A plurality of pressure buttons are each adapted to transmit to the pressure sensor a discretely defined predetermined pressure. For convenience, a plurality of memory buttons are included to transmit a corresponding discrete predetermined temperature and discrete predetermined pressure upon the depression thereof. An actuator switch is adapted to transmit a deactivation signal to the mixing valve for precluding water flow at the discretion of the user.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved shower temperature and pressure control system which has all the advantages of the prior art shower control systems and none of the disadvantages.

It is another object of the present invention to provide a new and improved shower temperature and pressure control system which may be easily and efficiently manufactured and marketed.

It is a further object of the present invention to provide a new and improved shower temperature and pressure control system which is of a durable and reliable construction.

An even further object of the present invention is to provide a new and improved shower temperature and pressure control system which is susceptible of a low cost of manufacture with regard to both materials and labor, and which accordingly is then susceptible of low prices of sale to the consuming public, thereby making such shower temperature and pressure control system economically available to the buying public.

Still yet another object of the present invention is to provide a new and improved shower temperature and pressure control system which provides in the apparatuses and methods of the prior art some of the advantages thereof, while simultaneously overcoming some of the disadvantages normally associated therewith.

Still another object of the present invention is to allow convenient control of a system for automatically regulating both the temperature and pressure of water flow in a shower.

Lastly, it is an object of the present invention to provide a new and improved shower temperature and pressure control system including a bathtub with an associated shower outlet. A mixing valve is coupled to a hot water source and a cold water source. The mixing valve is adapted to control the amount of hot water and cold water to flow so as to maintain a flow of water with a constant temperature corresponding to a predetermined temperature. A restrictive valve is adapted to control the water pressure so that a flow of water is maintained with a constant pressure corresponding to a predetermined pressure. Finally, a control unit has temperature selection buttons adapted to transmit to the temperature sensor a predetermined temperature and pressure selection buttons adapted to transmit to the pressure sensor a predetermined pressure thus affording a unique method of controlling both the temperature and pressure of a shower.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
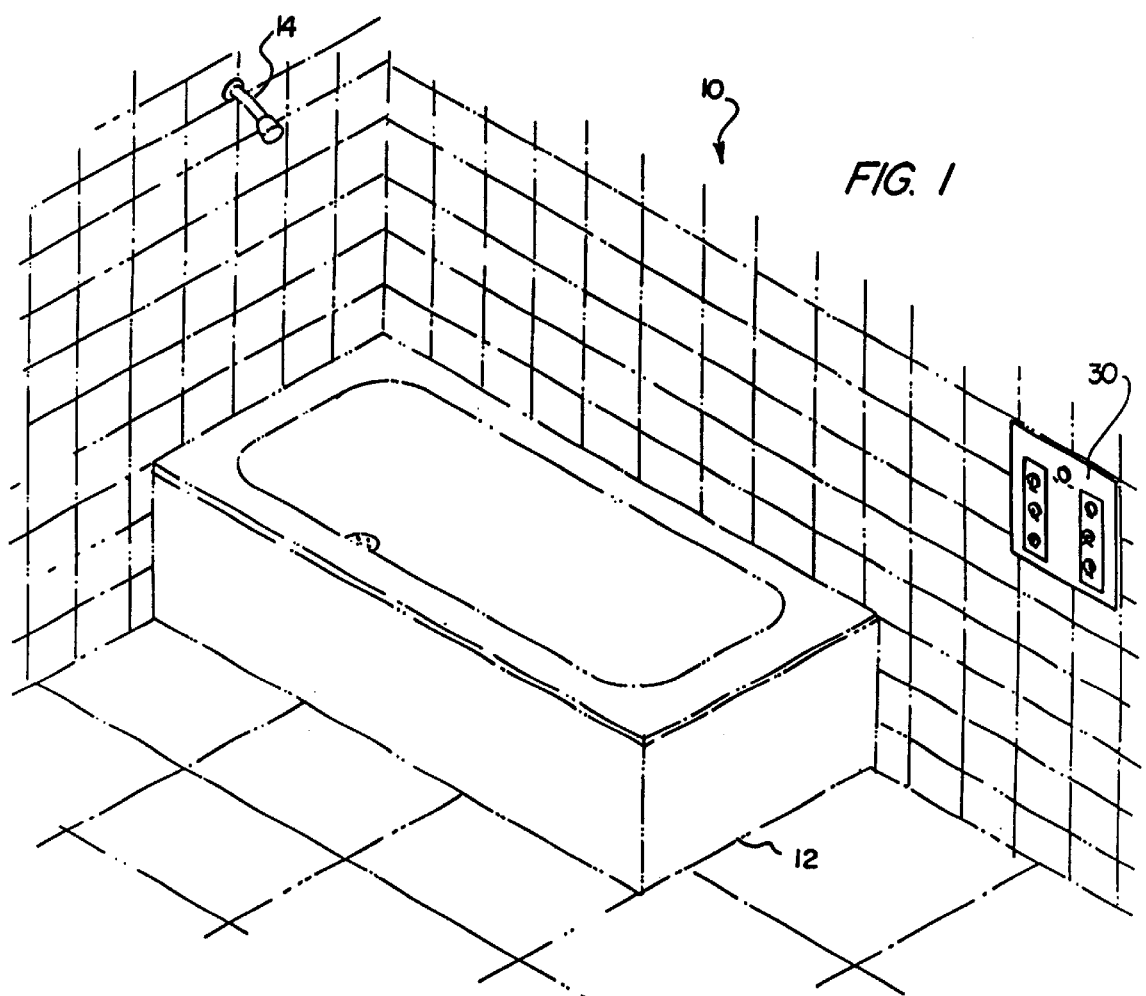
FIG. 1 is a perspective illustration of the preferred embodiment of the shower temperature and pressure control system constructed in accordance with the principles of the present invention.

With reference now to the drawings, and in particular to FIG. 1 thereof, a new and improved shower temperature and pressure control system embodying the principles and concepts of the present invention and generally designated by the reference numeral 10 will be described.

The present invention, the new and improved shower temperature and pressure control system, is comprised of a plurality of components. Such components in their broadest context include a bathtub, mixing valve, temperature sensor, alarm, restrictor valve, pressure sensor, and control unit. Such components are individually configured and correlated with respect to each other so as to attain the desired objective.

More specifically, it will be noted that the system 10 of the present invention includes a bathtub 12 with an associated shower outlet 14. The shower outlet is coupled to a wall above the bathtub for dispensing water therefrom.

Also included is a mixing valve 16 situated behind the wall and coupled to a hot water source 18 and a cold water source 20. The mixing valve is adapted to control the amount of hot water and cold water to flow therefrom. Such flow is governed as a function of a temperature control signal.

Working in conjunction with the mixing valve is a temperature sensor 22 situated within the shower head. The temperature sensor is adapted to gauge the temperature of the water in the shower head and allow the comparison thereof with a predetermined temperature. The temperature sensor is adapted to subsequently transmit to the mixing valve a temperature control signal adapted to maintain a flow of water with a constant temperature corresponding to the predetermined temperature. The temperature sensor also generates an alarm signal upon the detection of water of which the temperature exceeds a predetermined amount. Such a temperature is preferably defined as the minimum temperature at which skin is scalded.

Also included is an alarm 24 connected to the temperature sensor for producing an audible alarm after receiving the alarm signal. The alarm also generates a deactivation signal upon the receipt of the alarm signal. The alarm is included for protecting a user from dangerous high temperature water flow.

For controlling the pressure of water flow, a restrictive valve 26 is situated behind the wall and coupled to the alarm. The restrictive valve is adapted to control the water pressure in a first mode of operation as a function of a pressure control signal. The restrictive valve is further adapted to preclude water flow to the shower outlet in a second mode of operation upon the receipt of a deactivation signal.

A pressure sensor 28 is connected to the restrictive valve and showerhead. The pressure sensor is adapted to gauge the pressure of the water in the shower head and allow the comparison thereof with a predetermined pressure. Acting as a feedback mechanism, the pressure sensor subsequently transmits to the restrictive valve a pressure control signal so as to maintain a flow of water with a constant pressure corresponding to the predetermined pressure.

Figure 2:
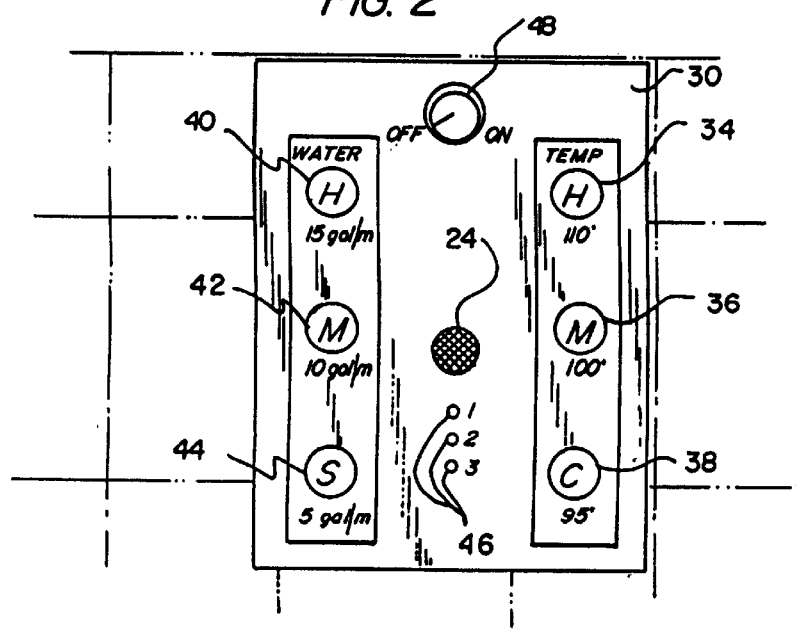
FIG. 2 is a front plan view of the control unit.
Figure 3:
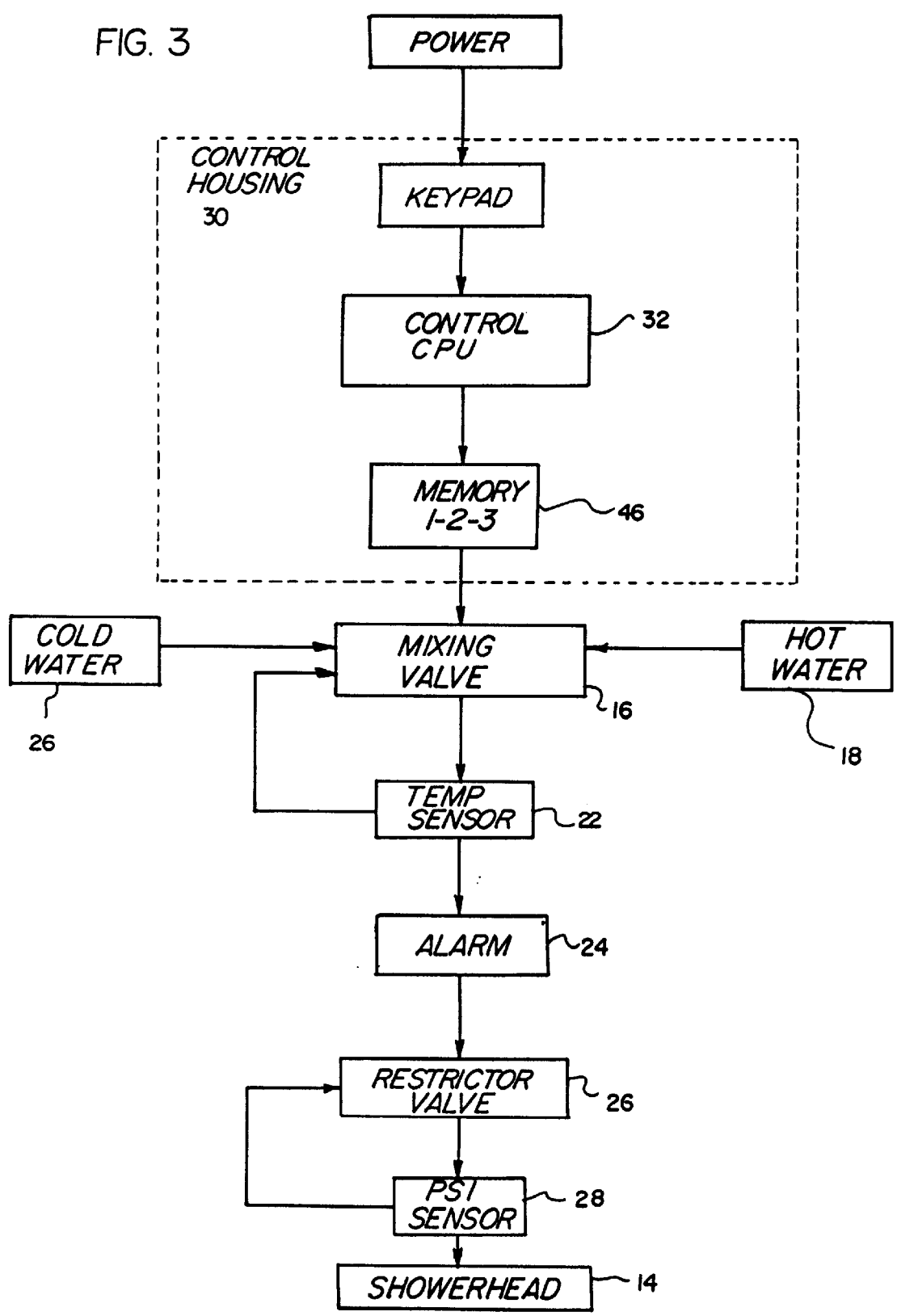
FIG. 3 is a flow chart showing the interaction of the components employed within the present invention.
Figure 4:
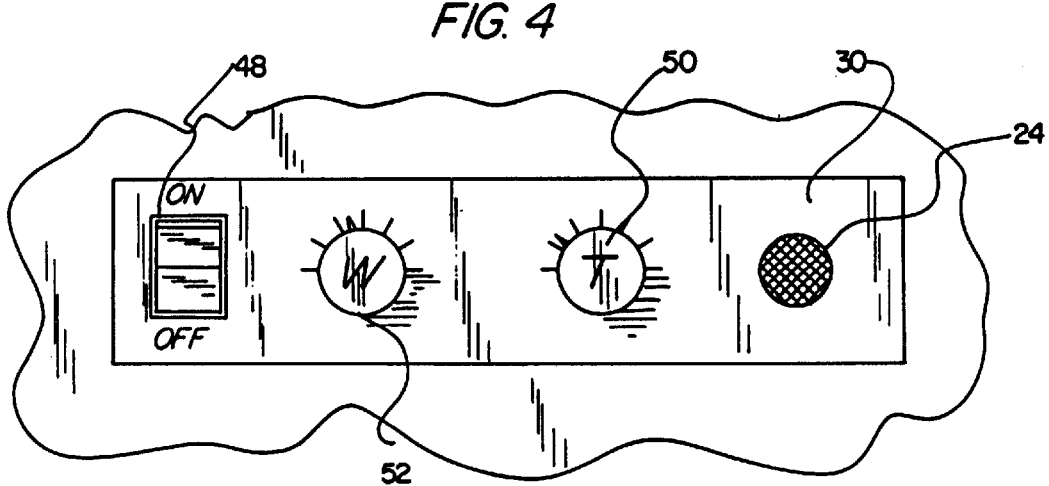
FIG. 4 is a front elevation view of the control unit employed in an alternate embodiment.

Finally, as best shown in FIG. 2, a control unit 30 is situated on the wall above the bathtub. Control circuitry 32 is included within the control panel for facilitating the operation thereof. Preferably, the control unit includes a panel formed flush with the wall and easily accessible by a user within the bathtub. The control unit has a plurality of temperature buttons each adapted to discretely define the predetermined temperature and allow the transmission thereof to the temperature sensor. Ideally, there is a total of three temperature buttons linearly aligned in a vertical orientation including a 110-degree button 34, a 100-degree button 36, and a 95-degree button 38. A plurality of pressure buttons are each adapted to transmit to the pressure sensor a discretely defined predetermined pressure. The pressure buttons suitably comprise of a 15 gallon/minute button 40, a 10 gallon/minute button 42, and a 5 gallon/minute button 44 all of which are linearly aligned in a vertical orientation. For convenience, three memory buttons 46 are included to transmit a corresponding discrete predetermined temperature and discrete predetermined pressure upon the depression thereof. Identification indicia are included adjacent to each memory button. An actuator switch 48 is adapted to transmit a deactivation signal to the mixing valve for precluding water flow. Upon the activation of the present invention, the control circuitry is adapted to define a minimal predetermined temperature and pressure prior to the selection thereof.

Associated with the apparatus of the present invention is a method of operating the control panel. First, a user must activate the actuator switch of the control panel. The present invention immediately allows water to flow with a safe minimal temperature and pressure for allowing the water within an associated plumbing system to reach a proper temperature. At the discretion of the user, both a temperature and pressure button are depressed for producing a specific water flow. Optionally, a preset memory button may be depressed for affording a water flow with an associated pressure and temperature. Upon the temperature within the shower head surpassing a predetermined level, the restrictor valve acts to protect the user from scalding by precluding water flow.

Figure 5:
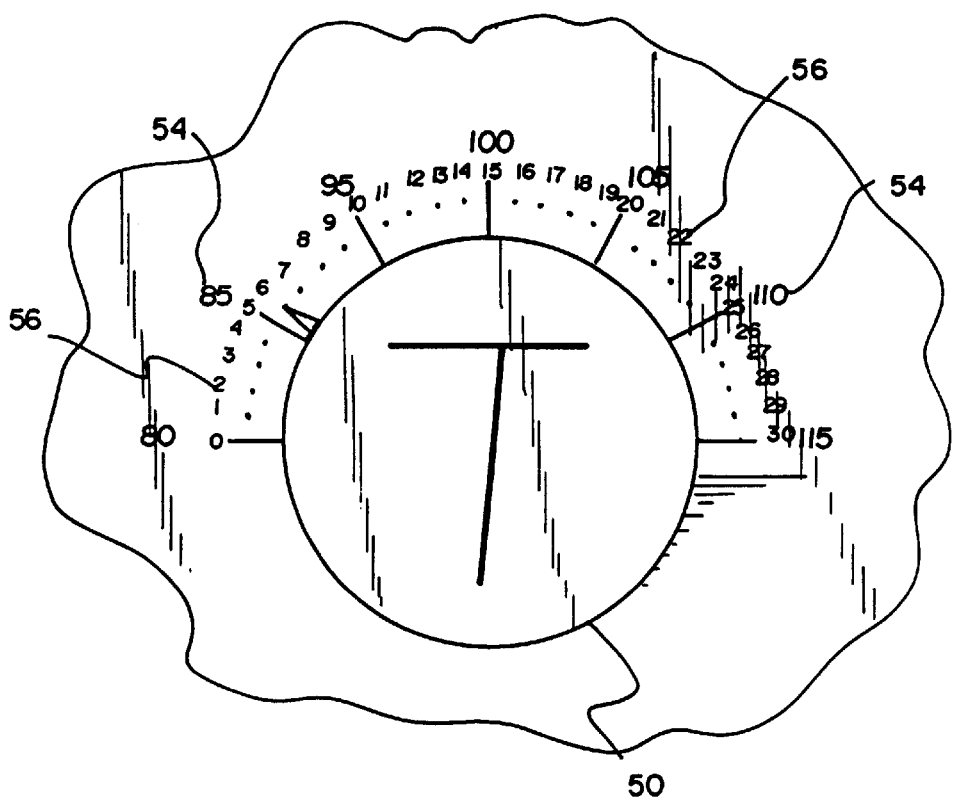
FIG. 5 is a front plan view of the temperature dial of the alternate embodiment.

With reference now to FIGS. 5 & 6, an alternate embodiment is shown with a temperature dial 50 adapted to transmit to the temperature sensor a predetermined temperature. Also included is a pressure dial 52 adapted to transmit to the pressure sensor a predetermined pressure. The temperature dial has temperature indicia 54 for depicting a spectrum of temperatures and an absolute scale 56 for allowing easy recollection of a desired setting. Similarly, the pressure dial has pressure indicia for depicting a spectrum of pressures and an absolute scale for allowing easy recollection of a desired setting.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A shower temperature and pressure control system comprising, in combination:

a bathtub with an associated shower head coupled to a wall above the bathtub for dispensing water therefrom;

a mixing valve situated behind the wall and coupled to a hot water source and a cold water source, the mixing valve adapted to control the amount of hot water and cold water to flow therefrom as a function of a temperature control signal;

a temperature sensor situated within the shower head and connected to the mixing valve, the temperature sensor adapted to gauge the temperature of the water in the shower head and allow the comparison thereof with a predetermined temperature, the temperature sensor adapted to subsequently transmit to the mixing valve a temperature control signal so as to maintain a flow of water with a constant temperature corresponding to the predetermined temperature, wherein the temperate sensor generates an alarm signal upon the detection of water of which the temperature exceeds a predetermined amount;

an alarm connected to the temperature sensor for producing an audible alarm and generating a deactivation signal upon the receipt of the alarm signal;

a restrictive valve situated behind the wall and coupled to the alarm, the restrictive valve adapted to control the water pressure in a first mode of operation as a function of a pressure control signal, the restrictive valve further adapted to preclude water flow to the shower head in a second mode of operation upon the receipt of the deactivation signal;

a pressure sensor connected to the restrictive valve and shower head, the pressure sensor adapted to gauge the pressure of the water in the shower head and allow the comparison thereof with a predetermined pressure, the pressure sensor adapted to subsequently transmit to the restrictive valve a pressure control signal so as to maintain a flow of water with a constant pressure corresponding to the predetermined pressure; and a control unit situated on the wall above the bathtub, the control unit having a plurality of temperature buttons each adapted to discretely define the predetermined temperature upon the depression thereof and allow the transmission thereof to the temperature sensor, a plurality of pressure buttons each adapted to transmit to the pressure sensor a discretely define predetermined pressure upon the depression thereof, a plurality of memory buttons each adapted to transmit a corresponding discrete predetermined temperature and discrete predetermined pressure upon the depression thereof, an actuator switch adapted to transmit a deactivation signal to the mixing valve for precluding water flow.

2. A shower temperature and pressure control system comprising:

a bathtub with an associated shower head;

a mixing valve coupled to a hot water source and a cold water source, the mixing valve adapted to control the amount of hot water and cold water to flow as a function of a temperature control signal;

a temperature sensor connected to the mixing valve, the temperature sensor adapted to gauge the temperature of the water in the shower head and allow the comparison thereof with a predetermined temperature, the temperature sensor adapted to subsequently transmit to the mixing valve a temperature control signal so as to maintain a flow of water with a constant temperature corresponding to the predetermined temperature;

a restrictive valve adapted to control the water pressure as a function of a pressure control signal;

a pressure sensor connected to the restrictive valve and shower head, the pressure sensor adapted to gauge the pressure of the water in the shower head and allow the comparison thereof with a predetermined pressure, the pressure sensor adapted to subsequently transmit to the restrictive valve a pressure control signal so as to maintain a flow of water with a constant pressure corresponding to the predetermined pressure;

a control unit having a temperature selection means adapted to transmit to the temperature sensor a predetermined temperature and a pressure selection means adapted to transmit to the pressure sensor a predetermined pressure; and an alarm connected to the temperature sensor for producing an audible alarm upon the receipt of the alarm signal, wherein the temperature sensor generates an alarm signal upon the detection of water of which the temperature exceeds a predetermined amount.

3. A shower temperature and pressure control system as set forth in claim 2 wherein the alarm generates a deactivation signal upon the detection of water of which the temperature exceeds a predetermined amount, whereby the restrictive valve is further adapted to preclude water flow upon the receipt of the deactivation signal.

4. A shower temperature and pressure control system comprising:

a bathtub with an associated shower head;

a mixing valve coupled to a hot water source and a cold water source, the mixing valve adapted to control the amount of hot water and cold water to flow as a function of a temperature control signal:

a temperature sensor connected to the mixing valve, the temperature sensor adapted to gauge the temperature of the water in the shower head and allow the comparison thereof with a predetermined temperature, the temperature sensor adapted to subsequently transmit to the mixing valve a temperature control signal so as to maintain a flow of water with a constant temperature corresponding to the predetermined temperature;

a restrictive valve adapted to control the water pressure as a function of a pressure control signal;

a pressure sensor connected to the restrictive valve and shower head, the pressure sensor adapted to gauge the pressure of the water in the shower head and allow the comparison thereof with a predetermined pressure, the pressure sensor adapted to subsequently transmit to the restrictive valve a pressure control signal so as to maintain a flow of water with a constant pressure corresponding to the predetermined pressure; and a control unit having a temperature selection means adapted to transmit to the temperature sensor a predetermined temperature and a pressure selection means adapted to transmit to the pressure sensor a predetermined pressure, the control unit further comprising an actuator switch adapted to transmit a deactivation signal to the mixing valve, whereby the restrictive valve is further adapted to preclude water flow to the shower head upon the receipt of a deactivation signal.

5. A shower temperature and pressure control system comprising:

a bathtub with an associated shower head;

a mixing valve coupled to a hot water source and a cold water source, the mixing valve adapted to control the amount of hot water and cold water to flow as a function of a temperature control signal;

a temperature sensor connected to the mixing valve, the temperature sensor adapted to gauge the temperature of the water in the shower head and allow the comparison thereof with a predetermined temperature, the temperature sensor adapted to subsequently transmit to the mixing valve a temperature control signal so as to maintain a flow of water with a constant temperature corresponding to the predetermined temperature;

a restrictive valve adapted to control the water pressure as a function of a pressure control signal;

a pressure sensor connected to the restrictive valve and shower head, the pressure sensor adapted to gauge the pressure of the water in the shower head and allow the comparison thereof with a predetermined pressure, the pressure sensor adapted to subsequently transmit to the restrictive valve a pressure control signal so as to maintain a flow of water with a constant pressure corresponding to the predetermined pressure;

a control unit having a temperature selection means adapted to transmit to the temperature sensor a predetermined temperature and a pressure selection means adapted to transmit to the pressure sensor a predetermined pressure, the temperature selection means comprising a temperature dial adapted to transmit to the temperature sensor a predetermined temperature and a pressure dial adapted to transmit to the pressure sensor a predetermined pressure, the temperature dial including temperature indicia for depicting temperature and an absolute scale for allowing easy recollection of a desired setting and the pressure dial has pressure indicia for depicting pressure and an absolute scale for allowing easy recollection of a desired setting.

\* \* \* \* \*